United States Patent [19]

Satomi et al.

[11] Patent Number: 5,217,818
[45] Date of Patent: Jun. 8, 1993

[54] SUBSTRATE MATERIAL FOR MAGNETIC HEAD AND MAGNETIC HEAD USING SAME

[75] Inventors: Mitsuo Satomi, Katano; Ken Hirota; Koichi Kugimiya, both of Toyonaka, all of Japan

[73] Assignee: Matsushita Electric Industrial Co., Ltd., Osaka, Japan

[21] Appl. No.: 493,799

[22] Filed: Mar. 15, 1990

[30] Foreign Application Priority Data

Apr. 14, 1989 [JP] Japan .................. 1-095766

[51] Int. Cl.$^5$ .................................... B32B 9/00
[52] U.S. Cl. ........................... 428/692; 360/122; 420/430; 428/900; 501/41; 501/46
[58] Field of Search ............ 360/122; 501/41, 46; 428/665, 692, 694, 900; 420/430

[56] References Cited

U.S. PATENT DOCUMENTS

| | | | |
|---|---|---|---|
| 3,661,600 | 5/1972 | Izumitani et al. | 501/41 |
| 4,660,114 | 4/1987 | Yamakawa et al. | 360/122 |
| 4,681,813 | 7/1987 | Yamada et al. | 428/900 |

FOREIGN PATENT DOCUMENTS

| | | |
|---|---|---|
| 0194650 | 9/1986 | European Pat. Off. |
| 60-225406 | 11/1985 | Japan . |
| 6140869 | 2/1986 | Japan . |
| 62-143872 | 6/1987 | Japan . |
| 6-394422 | 4/1988 | Japan . |

OTHER PUBLICATIONS

Gardner et al. *Handbook of Chemical Synonyms and Tradenames*, 8th Ed. 1978; CRC Press.

*Primary Examiner*—Paul J. Thibodeau
*Assistant Examiner*—R. Follett
*Attorney, Agent, or Firm*—Stevens, Davis, Miller & Mosher

[57] ABSTRACT

A substrate material for a magnetic head, which comprises an oxide composed mainly of $WO_3$ and has a thermal expansion coefficient of 100 to $130 \times 10^{-7}/°$ C., and a magnetic head using the substrate material.

8 Claims, 1 Drawing Sheet

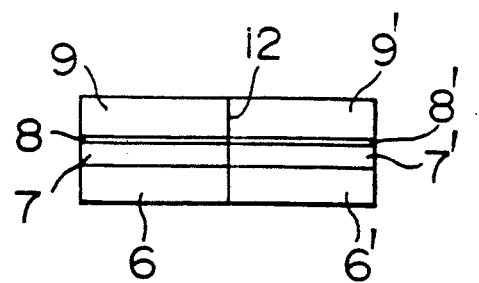
F I G. 1
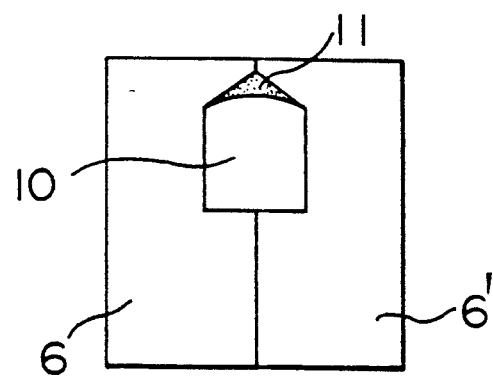
F I G. 2
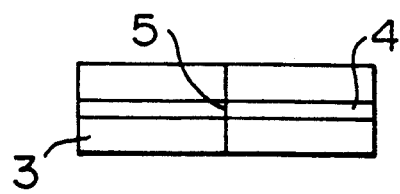
F I G. 3
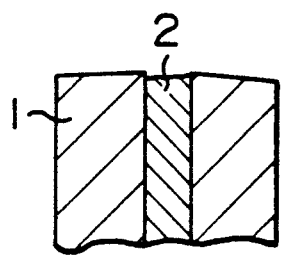
F I G. 4

SUBSTRATE MATERIAL FOR MAGNETIC HEAD AND MAGNETIC HEAD USING SAME

BACKGROUND OF THE INVENTION

This invention relates to a substrate material for a magnetic head and a magnetic head using it.

Ferrite has been conventionally widely used as a core material for a magnetic head due to its excellent machinability and wear resistance. However, its saturation magnetization is lower than alloy materials by 30 to 50 percent.

Therefore, when ferrite is used with high-density recording tapes having a high coercive force, which have been developed in recent years, the low saturation magnetization of the ferrite head core material is a problem, and the ferrite head has a poor S/N as compared with metal heads, since it causes a large rubbing noise during a tape running.

From the above viewpoint, Sendust and amorphous metal magnetic materials are used as a core material in a head for high density recording media.

A head using a metal magnetic material has a so-called sandwich structure as shown in FIG. 3, in which a metal magnetic material 4 of a tape-running surface having a gap 5 is placed between nonmagnetic substrate materials 3. In this case, the nonmagnetic substrate material is made of crystallization glass.

The problem in this case is partial abrasion between a substrate 1 and a metal magnetic material 2 when a tape runs, as is schematically shown in FIG. 4. That is, the magnetic material is suffered partial abrasion relative to the substrate, and a head output is hence decreased due to spacing loss. For this reason, performances of the substrate and metal magnetic materials such as coefficient of thermal expansion, etc., are required to be in agreement.

In order to overcome such a problem, calcium titanate ($CaTiO_3$)-based ceramic materials have been proposed as a substrate material for a magnetic head for use with high-density recording media, a metal evaporated tape in particular.

However, a ceramic substrate composed of such a material has very poor machinability. And, for example, the rate for cutting it with a diamond cutter is as poor as 1/5 to 1/10 of that for cutting a ferrite material, and mass-production of magnetic heads therefrom has been difficult.

It is an object of this invention to provide a substrate material for a magnetic head having a so-called sandwich structure of placement of a metal magnetic material between nonmagnetic substrate materials, which causes little partial abrasion between the substrate and the metal magnetic material when a tape runs, or is free from a decrease in head output caused by spacing loss when the magnetic material is suffered partial abrasion relative to the substrate, and which has excellent machinability, and a magnetic head using said substrate material.

SUMMARY OF THE INVENTION

According to this invention, there is provided a substrate material for a magnetic head, which contains an oxide composed mainly of $WO_3$ and has a thermal expansion coefficient of 100 to $130\times10^{-7}/°$ C.

According to this invention, there is also provided a magnetic head wherein at least that tape-running surface of a head chip which is to be in contact with a magnetic tape has a sandwich structure of placement of a magnetic substance between substrates, the substrates being composed of a substrate material having a thermal expansion coefficient of 100 to $130\times10^{-7}/°$ C. and containing an oxide composed mainly of $WO_3$.

In this invention, since the thermal expansion coefficient: $\alpha$ of the substrate is in agreement with that of the metal magnetic material (amorphous alloy $\alpha\approx115\times10^{-7}/°$ C., Sendust alloy $\alpha\approx130\times10^{-7}/°$ C., Permalloy $\alpha\approx120\times10^{-7}/°$ C.), a magnetic film can be formed by using a thin film forming apparatus, and the film is machinable almost as easily as Mn-Zn ferrite is. And, a magnetic head using it as a substrate suffers little partial abrasion between the substrate and an alloy magnetic material when a tape runs thereon. Hence, the head is free from a decrease in output and gives a stable output. Sendust is a noteworthy material because the alloy has a magnetic permeability equivalent to that of Permalloy but no expensive Ni. Permalloy is a term describing high magnetic permeability materials such as nickel and iron containing alloys having more than 30% Ni.

BRIEF DESCRIPTION OF THE DRAWINGS

FIG. 1 is a front view of a tape-running surface of a magnetic head as one embodiment of this invention.

FIG. 2 is a side view thereof.

FIG. 3 is a front view of a tape-running surface of a conventional magnetic head.

FIG. 4 is a side view of a tape-running surface of a conventional magnetic head.

DETAILED DESCRIPTION OF THE INVENTION

Embodiments of this invention will be explained hereinbelow by reference to drawings.

EXAMPLE 1

$WO_3$ and $Fe_2O_3$ or $Cr_2O_3$ were weighed out so as to form a composition as shown in Table 1, and the composition was wet-mixed in a ball mill for 16 hours and dried. Then, the mixture was calcined in air at 800° C. for 1 hour, and it was again wet-mixed in a ball mill for 16 hours and then dried. Thereafter, water was added as a binder, and the mixture was molded by using a mold with hydraulic press at 500 kg/cm².

Then, the compact was press-sintered by holding it in air at 950° C. to 1,100° C. for 2 hours under a pressure of 300 kg/cm².

TABLE 1

| No | Substrate $WO_3$ | $Fe_2O_3$ | $Cr_2O_3$ | Thermal expansion coefficient $\alpha$ $10^{-7}/°$C. | Machinability |
|---|---|---|---|---|---|
| 1 | 95 | 5 | — | 140 | 1.1 |
| 2 | 91 | 9 | — | 130 | 0.9 |
| 3 | 80 | 20 | — | 108 | 1.1 |
| 4 | 70 | 30 | — | 100 | 1.3 |
| 5 | 60 | 40 | — | 95 | 1.6 |
| 6 | 97 | — | 3 | 138 | 1.0 |
| 7 | 95 | — | 5 | 130 | 1.0 |
| 8 | 90 | — | 10 | 108 | 1.2 |
| 9 | 85 | — | 15 | 100 | 1.5 |
| 10 | 80 | — | 20 | 90 | 1.8 |
| Conventional example | $CaTiO_3$ | | | 108 | 5.0 |

Table 1 also shows thermal expansion coefficients of sintered materials produced as above. Load currents of a spindle motor required for cutting these sintered materials which have the same dimension of a ferrite are shown in Table 1 as the machinability and the value is normalized with that required for cutting a ferrite. All of the materials exhibited a smaller cutting load than the material of calcium titanate ($CaTiO_3$), and could be easily cut or exhibited machinability similar to that of a ferrite.

EXAMPLE 2

Another embodiment of this invention is explained by reference to FIGS. 1 and 2, in which 6, 6', 9 and 9' each indicate a substrate, 7 and 7' each indicate an amorphous alloy film, 8 and 8' each indicate a bonding glass layer, 10 indicates a winding aperture, 11 indicates a bonding glass, and 12 indicates a gap. A substrate 6 was formed by specularly polishing a sintered body having a composition shown in Table 1 as a substrate material and fully washing it. A vacuum chamber was evacuated to $3 \times 10^{-7}$ Torr, and then, an Ar gas was introduced until the pressure inside the chamber was $2 \times 10^{-2}$ Torr. $Co_{81}Nb_{13}Zr_6$ as a target composition was sputtered to form an amorphous alloy film 7 having a thickness of 30 $\mu$. Separately, a substrate 9 of which the material was same as that of the substrate 6 was bonded through a bonding glass layer 8 to form a core. Then, a winding aperture 10 was made in a gap-facing surface, and the facing surface was specularly polished with a diamond paste. Thereafter, $SiO_2$ as a gap spacer material was sputtered on the surface in a predetermined thickness, whereby one block for gap formation was completed. A laminated core half-body having the same structure, composed of 6' to 9', as that of the above block, was combined with said block, and a gap was formed by using a bonding glass 11. A predetermined head was taken from a bar composed of a pair of these two blocks, and completed. As a comparative example, a head using a crystallization glass as a substrate was also prepared.

Each of the heads of this invention prepared as above and the head as the comparative example was set in a video tape recorder (head/tape relative velocity 3.8 mm/second), and a tape running test was carried out by using a metal evaporated tape. When the head using a crystallization glass was used, a great decrease in head output was observed, whereas the heads using the material of this invention as a substrate showed a stable output. Table 2 shows a partial abrasion between the substrate and the metal magnetic material (as an abrasion depth difference between the substrate and metal magnetic material) after the metal evaporated tape was run for 100 hours. In addition, the head output stands for a value when the initial value is 0 dB.

TABLE 2

| Substrate material | Partial abrasion (A) | Output (dB) |
|---|---|---|
| $WO_3$—$Fe_2O_3$ | 50 | −0.2 |
| $WO_3$—$Cr_2O_3$ | 70 | −0.5 |
| Crystallization glass | 200 | −2.5 |

The compositions of the substrate materials shown in Table 2 are not defined. However, almost like results were obtained when the substrate materials were those which are recited in claims.

In this invention, the composition of the substrate material is limited to 70 to 91 mol % of $WO_3$ and 9 to 30 mol % of $Fe_2O_3$ or 85 to 95 mol % of $WO_3$ and 5 to 15 mol % of $Cr_2O_3$ for the following reason. If the composition is outside the above range, the thermal expansion coefficient of the substrate material becomes more than $130 \times 10^{-7}/°$ C. or less than $100 \times 10^{-7}/°$ C., and when an amorphous alloy is deposited by using a sputtering apparatus, etc., there is a risk of an alloy film being peeled from the substrates. The substrate material may contain some other oxides and in some cases, nitrides and carbides to some extent of several percent so long as the thermal expansion coefficient: $\alpha$ in the range 100 to $130 \times 10^{-7}/°$ C. and machinability thereof are not deteriorated. Further, not only an amorphous alloy film of a metal-metal system such as Co-M (M denotes a metal such as Nb, Ti, Ta, Zr, W or the like) or Co-M'-M'' (M' and M'' each denote a metal as defined for the above M) is usable, but also an amorphous alloy film of a metal-metalloid system containing Si, B, C or P is also usable without any special problem. In addition, the above embodiments have discussed metal magnetic materials having a monolayer head core. However, laminated cores composed alternately of magnetic material(s) and interlayer insulating material(s) also have a similar effect. Further, some effect is obtained even when the amorphous alloy film is substituted with Sendust (Fe-Si-Al) alloy film In that case the composition of Sendust alloy is not critical to obtain the effect. This also stands for the substitution of the amorphous alloy film with permalloy alloy film, and a like effect can be obtained.

As discussed above, this invention uses a ceramic material of an oxide composed mainly of $WO_3$ in a magnetic head. Therefore, the ceramic material has better machinability than a conventional material of calcium titanate ($CaTiO_3$), and hence, has excellent machinability. A magnetic head using it as a substrate material has a nearly same thermal expansion coefficient as that of an amorphous alloy. Thus, there is no peeling problem of an amorphous alloy film from the substrates even if it is formed by using a sputtering apparatus. Further, concerning a magnetic head having a sandwich structure in which a metal magnetic material is placed between nonmagnetic substrate materials, the magnetic head of this invention suffers less partial abrasion between the substrate and the metal magnetic material than a magnetic head using a crystallization glass. That is, the magnetic head of this invention is free from a decrease in head output caused by spacing loss or a dent of the magnetic material relative to the substrate. Therefore, a stable output can be obtained, and highly reliable magnetic heads can be provided.

What is claimed is:

1. A substrate material for a magnetic head, which consists essentially of 70 to 91 mol % of $WO_3$ and 9 to 30 mol % of $Fe_2O_3$.

2. A magnetic head comprising a head chip having at least one tape-running surface, wherein at least that tape-running surface of the head chip which is to be in contact with a magnetic tape comprises a magnetic material sandwiched between substrates, said magnetic head comprising a substrate material recited in claim 1.

3. A magnetic head according to claim 2, wherein the magnetic substance comprises an amorphous alloy.

4. A magnetic head according to claim 2, wherein the magnetic substance comprises an Fe-Si-Al alloy or a Ni-Fe alloy which contains more than 30% Ni.

5. A substrate material for a magnetic head, which consists essentially of 85 to 95 mol % of $WO_3$ and 5 to 15 mol % of $Cr_2O_3$.

6. A magnetic head comprising a head chip having at least one tape-running surface, wherein at least that tape-running surface of the head chip which is to be in contact with a magnetic tape comprises a magnetic material sandwiched between substrates, said magnetic head comprising a substrate material recited in claim 5.

7. A magnetic head according to claim 6, wherein the magnetic material comprises an amorphous alloy.

8. A magnetic head according to claim 6, wherein the magnetic material comprises an Fe-Si-Al alloy or a Ni-Fe alloy which contains more than 30% Ni.

* * * * *